United States Patent
Meshram

(10) Patent No.: US 11,288,954 B2
(45) Date of Patent: Mar. 29, 2022

(54) TRACKING AND ALERTING TRAFFIC MANAGEMENT SYSTEM USING IOT FOR SMART CITY

(71) Applicant: Kundan Meshram, Balaghat (IN)

(72) Inventor: Kundan Meshram, Balaghat (IN)

(*) Notice: Subject to any disclaimer, the term of this patent is extended or adjusted under 35 U.S.C. 154(b) by 0 days.

(21) Appl. No.: 17/144,173

(22) Filed: Jan. 8, 2021

(65) Prior Publication Data
US 2021/0134146 A1    May 6, 2021

(51) Int. Cl.
| | |
|---|---|
| *G08G 1/005* | (2006.01) |
| *G06K 9/00* | (2022.01) |
| *G16Y 40/60* | (2020.01) |
| *G06V 20/52* | (2022.01) |
| *G06K 9/62* | (2022.01) |

(52) U.S. Cl.
CPC ............ *G08G 1/005* (2013.01); *G06K 9/00* (2013.01); *G06K 9/0057* (2013.01); *G06K 9/00557* (2013.01); *G06K 9/6289* (2013.01); *G06V 20/53* (2022.01); *G16Y 40/60* (2020.01)

(58) Field of Classification Search
CPC . G06F 3/01; G06F 3/011; G06F 3/018; G06F 3/0481; G06K 9/00; G06K 9/0063; G06K 9/00664; G06K 9/00677; G06K 9/00785; G06K 9/00791; G06K 9/6201; G06K 9/00778; G06K 9/0055; G06K 9/00557; G06K 9/0057; G06K 9/62; G06K 9/6276; H04L 12/18; H04L 12/1818; G08G 1/00; G08G 1/005
See application file for complete search history.

(56) References Cited

U.S. PATENT DOCUMENTS

| | | | |
|---|---|---|---|
| 8,676,937 B2* | 3/2014 | Rapaport | H04N 21/8358 709/219 |
| 10,803,714 B1* | 10/2020 | Khera | G08B 5/36 |
| 10,948,170 B1* | 3/2021 | Atwater | F21V 23/06 |
| 11,128,636 B1* | 9/2021 | Jorasch | A61B 5/369 |
| 2021/0081559 A1* | 3/2021 | Gratton | H04W 4/90 |

* cited by examiner

*Primary Examiner* — Van T Trieu
(74) *Attorney, Agent, or Firm* — Rumit Ranjit Kanakia

(57) ABSTRACT

Tracking and alerting Traffic management system using IoT for smart city to determine a social distance or norms violation between a plurality of communicative pairs, each of the image have plurality of communicative pairs including two communicating entities participating in a corresponding one or more of the communicative acts, the system comprising: CCTV for captured User's data i.e User movements, facial data, Smartphone data in case of accident detection; wireless trans-receiver for event propagation and sending the data to database; Sensor for getting the data of smart phones based on GPS system specially in case of accidental case; processor having CNN technology for analyzing and reverting data to control room based and configured to determine the pairwise social distancing based on particular behavior like movement and stopping or falling; hardware for storing data captured based on classification and analyzed parameters; machine learning for integration of data received from processor or sensors for visualization and processing final data to the citizens or to governments for monitoring and sending data to alarming sensor for non instructive alert if violations of social distancing norms.

7 Claims, 7 Drawing Sheets

(i) (ii) (iii)

(i) (ii) (iii) (iv)

TRACKING AND ALERTING TRAFFIC MANAGEMENT SYSTEM USING IOT FOR SMART CITY

TECHNICAL FIELD

The present invention relates to Tracking and alerting Traffic management system for maintaining social distancing using internet of things (IoT) for smart city to improve the efficiency of traffic management.

BACKGROUND OF THE INVENTION

Human development since the Industrial Revolution has had serious impacts on the environment, and the growth and destructive actions of human society have resulted in negative impacts on the Earth's sub-systems. Therefore everyone is facing a systematic sustainability challenge, wherein human behaviour cannot continue on the same course without having significant negative impacts on future generations' ability to meet their needs. Reaching sustainability will require significant and widespread changes in human behavior. The global urbanization trend is creating an urgency to find smarter ways to manage the accompanying challenges. Sustainable cities have become a highly desired goal for future urban development. Focus on the concept of smart cities, defined as cities where "investments in human and social capital and traditional (transport) and modern (ICT) communication infrastructure fuel sustainable economic growth and a high quality of life, with a wise management of natural resources, through participatory governance" is needed. Smart cities highlight important aspects of sustainability, such as the need for responsible resource management, energy efficiency, and citizen engagement. However, the smart city concept can only help a city to reach sustainability if it allows it to function within the natural boundaries of the Earth. Given the present day understanding of the smart city concept, it is unclear whether it holds the necessary characteristics to ensure that sustainable development can occur. Smart cities are highly complex and interdependent, since they are built from large, interconnected systems. Studying them would therefore require an approach that works well in complexity. By studying the smart city concept through a Strategic Sustainable Development (SSD) approach, one is able to examine it from a systems perspective, and evaluate whether sustainability can be reached in a strategic manner. Applying sustainable development in a strategic manner is achieved through a systems thinking approach, an understanding of sustainability through a definition that is based on scientifically-reviewed principles, and a back casting-from-principles strategy. The SSD approach can be applied through a framework, referred to as the Framework for Strategic Sustainable Development (FSSD). This allows for various stakeholders working within a concept to develop a shared mental model, which aids in the understanding and planning for complex problems. The purpose of our research will be to explore the concept of smart cities through a lens of sustainability, informed by an SSD approach. The inherent systems thinking mindset within the SSD approach allows us to effectively examine and address problems that are complex and require innovative solutions. It is required to investigate whether the increasingly popular concept of smart cities can truly be applied as an approach for making cities sustainable. Any identified opportunities for enhancements of the concept will be addressed with recommendations based on an FSSD perspective.

U.S. Pat. No. 9,613,530 discloses computer-implemented method and system for vehicular traffic control and vehicle routing includes receiving a request for a best route, at a central system. The request including a current location and a destination from a requesting vehicle. Travel factors from the current location to the destination are determined. The travel factors include road availability, traffic conditions, and real time feedback, using the central system in response to receiving the request. The best route is determined for the requesting vehicle from the current location to the destination based on the travel factors, Field of Classification Search and real time feedback of the traffic conditions. The method and system includes initiating a plurality of traffic control actions along the route for the requesting vehicle. The traffic control actions are initiated along the route simultaneously and in concert with the requesting vehicle to clear the best route for the requesting vehicle to travel unobstructed to the destination.

U.S. Pat. No. 9,818,239 discloses method and system for detecting an accident of a vehicle, the method including: receiving a movement dataset collected at least at one of a location sensor and a motion sensor arranged within the vehicle, during a time period of movement of the vehicle, extracting a set of movement features associated with at least one of a position, a velocity, and an acceleration characterizing the movement of the vehicle during the time period, detecting a vehicular accident event from processing the set of movement features with an accident detection model, and in response to detecting the vehicular accident event, automatically initiating an accident response action.

U.S. Pat. No. 9,965,560 discloses system for searching for contents, the system comprising: a social networking service (SNS) database, the SNS database including content; and at least one processor configured to: receive a query to search content of the SNS database from a user, set a value representing a social distance from the user to other users within the SNS database, the social distance including one or more levels, narrow the content of the SNS database to content that is associated with one or more users including one or more contacts of the user that are within the set value of social distance from the user, perform a search, corresponding to the query, of content of the SNS database, gather results of the search, and provide the gathered results to the user.

U.S. Ser. No. 10/135,774 discloses A method for a computer system includes receiving a first user communication, determining a first group of users, determining a target number of users, determining whether the first group of users includes the target number of users, and if not, providing the communication to the first group of users, determining a hierarchal mapping of groups of users in response to user memberships, determining a second group of users from the hierarchal mapping, determining a plurality of social network relationship factors for the second group of users with respect to the first user, and providing the communication to at least a subset of users in the second group of users in response to the first plurality of social network relationship factors.

U.S. Ser. No. 10/201,421 digital magazine server presents content, which may include images, retrieved from various sources to a user. To improve presentation of images while allowing modification of images, the digital magazine server identifies feature points in an image and identifies regions of the image including the feature points. Groups of regions are generated based at least on the number of feature points in each region and the location of each region. Based on information associated with the groups, such as the location of various groups and the aspect ratio of various groups, one or more groups are selected and associated with the image. The selected groups may identify regions of the image including an object or not including an object, providing information for modifying the image without obscuring objects in the image.

U.S. Ser. No. 10/217,051 discloses system for evaluating communicative acts between communicative pairs to determine a social perception network representation. Each communicative pair includes two entities participating in a communicative act. The system includes a patterns database storing behavior recognition patterns defining particular behaviors that may be used in the communicative acts and a social perception score associated with each of the particular behaviors. The scoring processor determines a first pairwise social perception score for each communicative pair based on the particular behaviors in the communicative acts occurring during a first time frame. The scoring processor determines a different first pairwise social perception score for each of the communicative pairs during a first time frame and determines a different second social perception score for each of the communicative pairs during a second time frame. The communications network aggregation processor combines the pairwise social perception scores into a first social perception network representation.

U.S. Ser. No. 10/755,487 discloses system for evaluating communicative acts between communicative pairs to determine a social perception network representation. Each communicative pair includes two entities participating in a communicative act. The system includes a patterns database storing behavior recognition patterns defining particular behaviors that may be used in the communicative acts and a social perception score associated with each of the particular behaviors. The scoring processor determines a first pairwise social perception score for each communicative pair based on the particular behaviors in the communicative acts occurring during a first time frame. The scoring processor determines a different first pairwise social perception score for each of the communicative pairs during a first time frame and determines a different second social perception score for each of the communicative pairs during a second time frame. The communications network aggregation processor combines the pairwise social perception scores into a first social perception network representation.

BRIEF SUMMARY OF THE INVENTION

In accordance with the purposes of the invention, the present invention as embodied and broadly described herein, relates to a Tracking and alerting Traffic management system for maintaining social distancing using IoT for smart city to improve the efficiency of traffic management which are integrated with cameras for effective rule following detection, and a series of smart-phones for identification of accidents and other driver relation conditions. It will help in improving the overall structure of smart city development.

According to one aspect of the invention a tracking and alerting traffic management system using internet of things (IoT) for smart city to determine a social distance or norms violation between a plurality of communicative pairs, each of the image have plurality of communicative pairs including two communicating entities participating in a corresponding one or more of the communicative acts is disclosed. The system comprises:
a) a CCTV for capturing user's data i.e user movements, facial data, or smartphone data in case of accident detection;
b) a wireless trans-receiver for event propagation and sending the data to database;
c) a sensor for getting the data of smart phones based on GPS system specially in case of accidental case;
d) a processor having CNN technology for analyzing and reverting data to control room based and configured to determine the pairwise social distancing based on particular behavior like movement and stopping or falling;
e) a hardware for storing data captured based on classification and analyzed parameters;
f) machine learning based device for integration of data received from processor or sensors for visualization and processing final data to the citizens or to governments for monitoring and sending data to alarming sensor for non instructive alert if violations of social distancing norms.

According to one aspect of the invention, the processor is configured to present at least the first social distance and the second social distance between communicative pairs to indicate changes in respective social perception levels on real time basis.

According to one aspect of the invention, the CNN is designed for identifying facial data of users wherein data is captured for masked, non-masked users, helmet wearing and non-helmet wearing users.

According to one aspect of the invention, the sensor for getting smart phone data is used in case of accidental alert and tracking if the readings go beyond a predetermined level to transmit the information in a wireless manner with help of an accelerometer.

According to one aspect of the invention, the wireless trans-receiver device propagates the events either to other vehicles or to the authorities.

According to one aspect of the invention, the Machine learning techniques are used for classification of data or analysing propagated data for early accidental detection.

According to one aspect of the invention, an alarm is attached to the CCTV camera for alerting the user in case social distancing norms are violated or in case of overcrowding.

BRIEF DESCRIPTION OF THE DRAWINGS

The advantages and features of the present invention will become better understood with reference to the following detailed description taken in conjunction with the accompanying drawings, in which:

FIG. 6 (a), FIG. 6 (b) and FIG. 6 (c) illustrate results of searching content on real time basis according to an embodiment of the present disclosure.

DETAILED DESCRIPTION OF THE INVENTION

Figure 1:
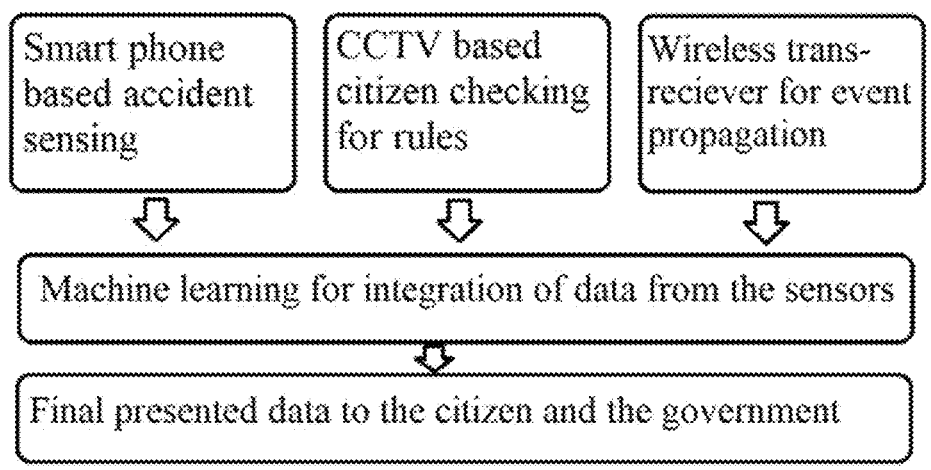
FIG. 1 illustrates a block diagram of system according to the embodiment of the present invention.
Figure 2:
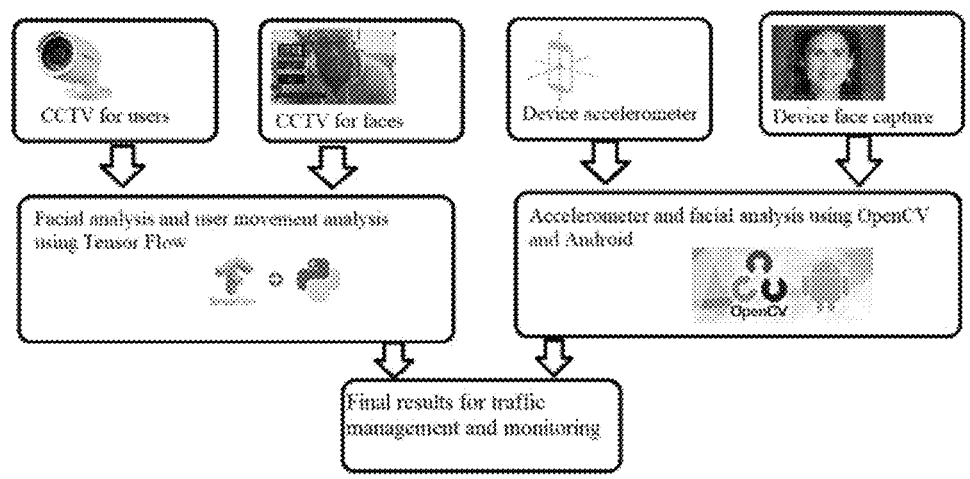
FIG. 2 illustrates a block diagram illustrating a configuration of an electronic devices and hardware according to an embodiment of the present disclosure.

FIG. 1 shows the constructional features of system in accordance with embodiments of present invention. System tracks the user movements using the CCTV cameras. User facial data is captured using CCTV cameras. Smartphone data is captured for accident detection. Smartphone data is captures for drowsiness detection. The CCTV captured data is given to a neural network for propagating the system for user movements. Facial data training is done using CNN wherein data is captured using for masked, non-masked users, helmet wearing and non-helmet wearing users. All this data is used with new images and videos to evaluate the CNN. The CNN finds the presence of social distancing, mask wearing and helmet wearing. The smart phone data is used in combination with this to detect drowsiness of the user using the mentioned techniques. Using the given steps, the novel vehicular network is created, and the user data is tracked for better traffic and user management.

User's data is captured using the following process,
User movements are tracked using CCTV cameras
User facial data is captured using CCTV cameras
Smartphone data is captured for accident detection
Smartphone data is captures for drowsiness detection The CCTV captured data is given to a convolutional neural network for training the system for user movements. Facial data training is done using CNN wherein data is captured using for masked, non-masked users, helmet wearing and non-helmet wearing users. All this data is used with new images and videos to evaluate the CNN The CNN finds the presence of the following,
Are people following social distancing or not?
Are the people wearing masks or not?
Are the people wearing helmets or not?

The smart phone data is used in combination with this to detect drowsiness of the user using the following technique,
User's facial data is captured.
Face, eyes and mouth are extracted using Viola Jones cascade object detection.
Probability of Eye opening is calculated, if that probability is lower than a given percentage, then the person is warned that their eyes are getting closed.
Probability of mouth opening is calculated, if that probability is higher than a given percentage, then the person is warned that their mouth is opened, which indicates yawning.
If a person's eye and mouth thresholds are getting crossed repeatedly, then the person is marked as a drowsy person, and they are warned with a loud noise signal.

All these details are continuously tracked and the person is alerted. The accelerometer data is also tracked, and if the readings go beyond a particular level, then the user accident is detected. This accident is propagated to nearby users so that post-accident care can be given to the users. Using the given steps, the novel vehicular network is created, and the user data is tracked for better traffic and user management.

Android phone for accelerometer-based detection of accidents. CCTV hardware will be needed for rules checking. Wireless trans-receiver devices will be needed for propagation of these events either to other vehicles, or to the authorities. The following is the hardware diagram for the system.

The accelerometer is a sensor that enables users with an upgraded experience by adjusting an orientation of the app screen in the smart phone and tablet. The core objective of the mobile phone accelerometer is, the device adapts the orientation as per the device position from horizontal to vertical and vice-versa. To provide a comfortable viewing experience to the users, it measures the position and orientation change of the screens. Let's understand this with examples. If you play a game, then you cannot have a good experience with a horizontal view. A landscape view provides users with more space to play a game on touch-enabled devices. While using a banking app, then portrait view is highly preferred by users compared to vertical as it is quite easy to add and read the information. Thus, the accelerometer in smartphone allows you to adjust the view of an app per your viewing comfort.

The CCTV data is captured by a machine, and is processed on the Python compiler, where Tensor flow is used for deep learning. The TF data is captured in order to evaluate the Facial data and the user movement data. Android smart phone is used for accelerometer and face capture, which is used for drowsiness and accident detection.

User movements are tracked using CCTV cameras. User facial data is captured using CCTV cameras. Smartphone data is captured for accident detection. Smartphone data is captured for drowsiness detection. The CCTV captured data is given to neural network for training the system for user movements. Facial data training is done using CNN wherein data is captured using for masked, non-masked users, helmet wearing and non-helmet wearing users. All this data is used with new images and videos to evaluate the CNN. The CNN finds the presence of social distancing, mask wearing and helmet wearing. The smart phone data is used in combination with this to detect drowsiness of the user using the mentioned techniques. Using the given steps, the novel vehicular network is created, and the user data is tracked for better traffic and user management.

Human detection using visual surveillance system is an established area is done by sing capturing images from CCTV camera and data is saved in machine for movements of moving image i.e. human mean for identifying usual/unusual activities. In this direction, main focus required on advancements systems that need for helping intelligent systems to detect and capture human activities. Although human detection is an ambitious goal, due to a variety of constraints such as low-resolution video, varying articulated pose, clothing, lighting and background complexities and limited machine vision capabilities, wherein prior data on system for these challenges can improve the detection performance. Detecting an human which is in motion/stationary, incorporates two stages: object detection and object classification. The primary stage of object detection could be achieved by using background subtraction, optical flow and spatiotemporal filtering techniques. In the background subtraction method, the difference between the current frame and a first frame, at pixel or block level is captured and calculated. In optical flow-based object detection technique, flow vectors associated with the objects motion are analyzed over a time span in order to identify regions in motion for a given sequence of images. Optical flow based techniques consist of computational overheads and are sensitive to various motion related such as noise, colour and lighting.

Filter based approach in which the motion parameters are identified by using three-dimensional (3D) features of the person in motion in the image sequence. Object detection problems have been efficiently addressed by recently developed advanced techniques. In the last decade, convolutional neural networks (CNN), region-based CNN and faster region-based CNN used region proposal techniques to generate the object score prior to its classification and later generates the bounding boxes around the object of interest for visualization and other statistical analysis. CNN based approaches utilize classification, considers a regression based method to dimensionally separate the bounding boxes and interpret their class probabilities. Designed framework efficiently divides the image into several portions representing bounding boxes along with the class probability scores for each portion to consider as an object. The approach offers excellent improvements in terms of speed while trading the gained speed with the efficiency. The detector module exhibits powerful generalization capabilities of representing an entire image. Crowd counting emerged focused on crowd detection and person count by proposing multiple height homographies for head top detection and solved the occlusions problem associated with video surveillance related applications. Generated inputs from stationary cameras to perform background subtraction to track the model for the appearance and the foreground shape of the crowd in videos. Once an object is detected, processor using classification techniques can be applied to identify a human on the basis of shape, texture or motion-based features. The shape related information of moving regions such as points, boxes and blobs are determined to identify the human from cctv camera and saved in hardware linked to processor for analyzing the classification w.r.to different parameters. Proposed texture based schemes such as histograms of oriented gradient (HOG), which utilises high dimensional features based on edges along with the support vector machine to detect humans. Further identification of a person through video surveillance can be done by using face and gait recognition techniques. However, detection and tracking of people under crowd are difficult sometimes due to partial or full occlusion problems. This dataset is available for vision based research comprising a large number of datasets for varying tasks in the field of computer vision. In order to fine-tune the object detection and tracking models for identifying the person, open images datasets are considered. It is a collection of classes out of which the models are trained for the identification of a person. The images are annotated with image-level labels and corresponding coordinates of the bounding boxes representing the person. Dataset with different parameters for image classification, object detection, visual relationship detection, instance segmentation, and multimodal image descriptions will enable us to study and perform object detection tasks efficiently and stimulate progress towards genuine understanding of the scene.

Figure 3:
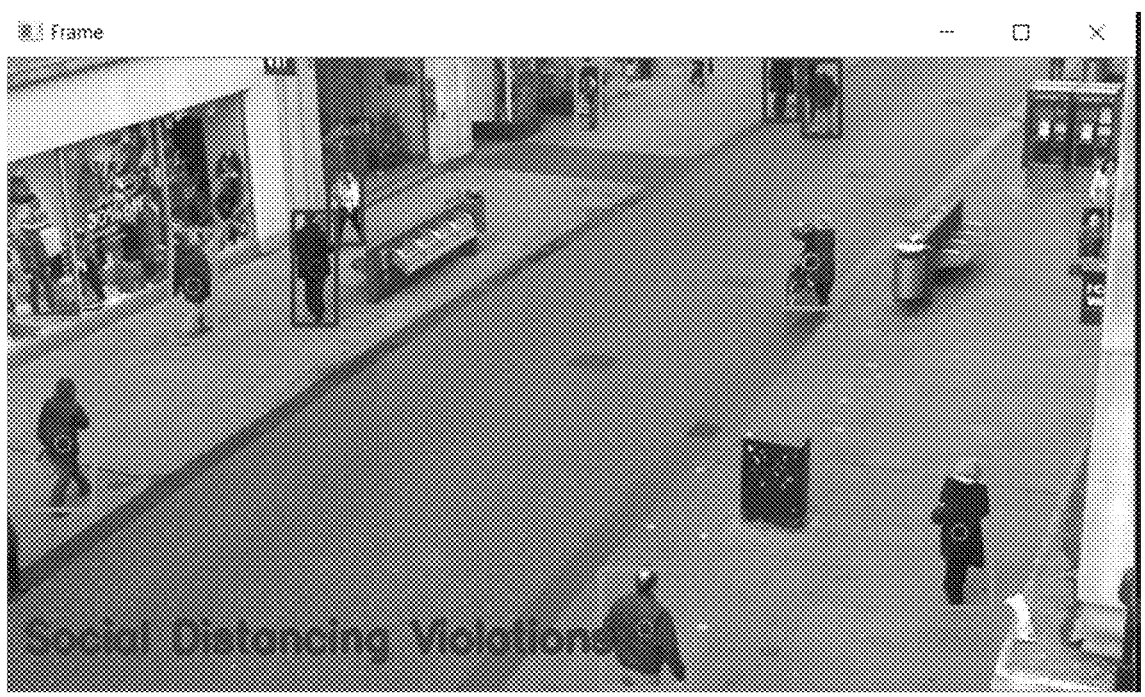
FIG. 3 illustrates results of searching content on real time basis according to an embodiment of the present disclosure.
Figure 4:
FIG. 4 illustrates results of searching content on real time basis according to an embodiment of the present disclosure.
Figure 5:
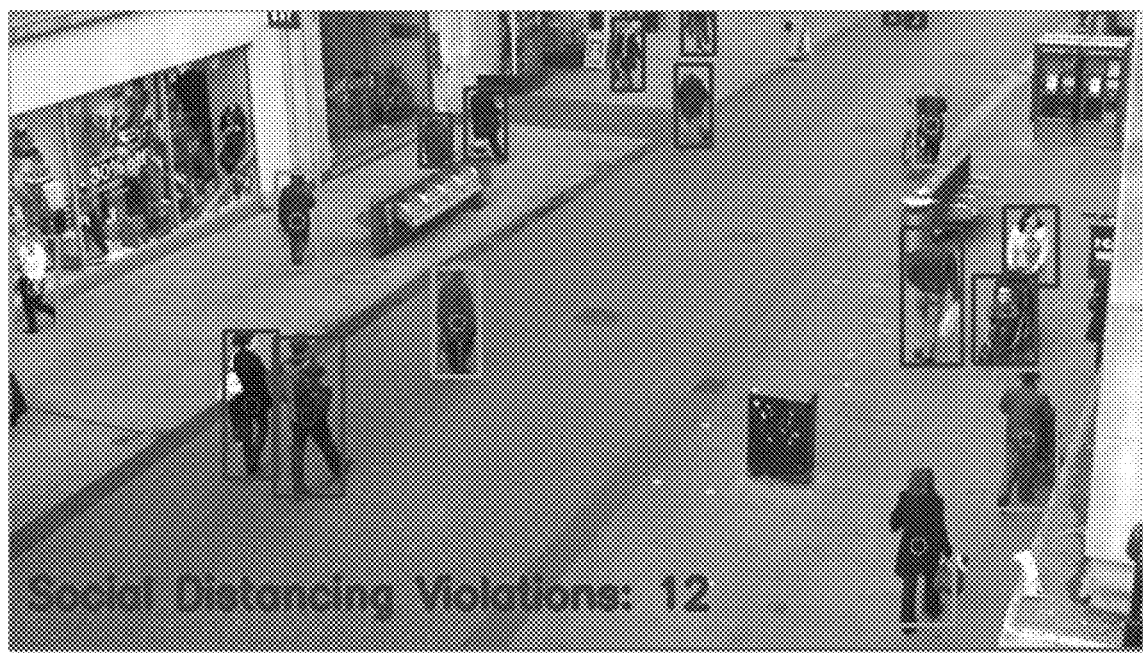
FIG. 5 illustrates results of searching content on real time basis according to an embodiment of the present disclosure.

The data for movements of image i.e. captured using active surveillance system having CCTV camera integrated with GPS system. The captured data is recorded as shown in FIG. 3,4,5,6. FIG. 3,4,5 show the image with movements of persons are categorized by classification. GPS data with image was also collected with cellphone tower based or mobile equipment identification no registration. The data is recorded and stored and analyzed based on different classification and legal norms for minimum distance for social distancing. The system must be real time based with data storing capabilities. Individuals should be intimated directly by the warning system through messages of violation of law warning message from server to particular no identified. The distance smaller than the prescribed as per law is detected, the system emit a non-alarming audio visual cue or send advisory signal to prevent overcrowding in market area.

Figure 6:
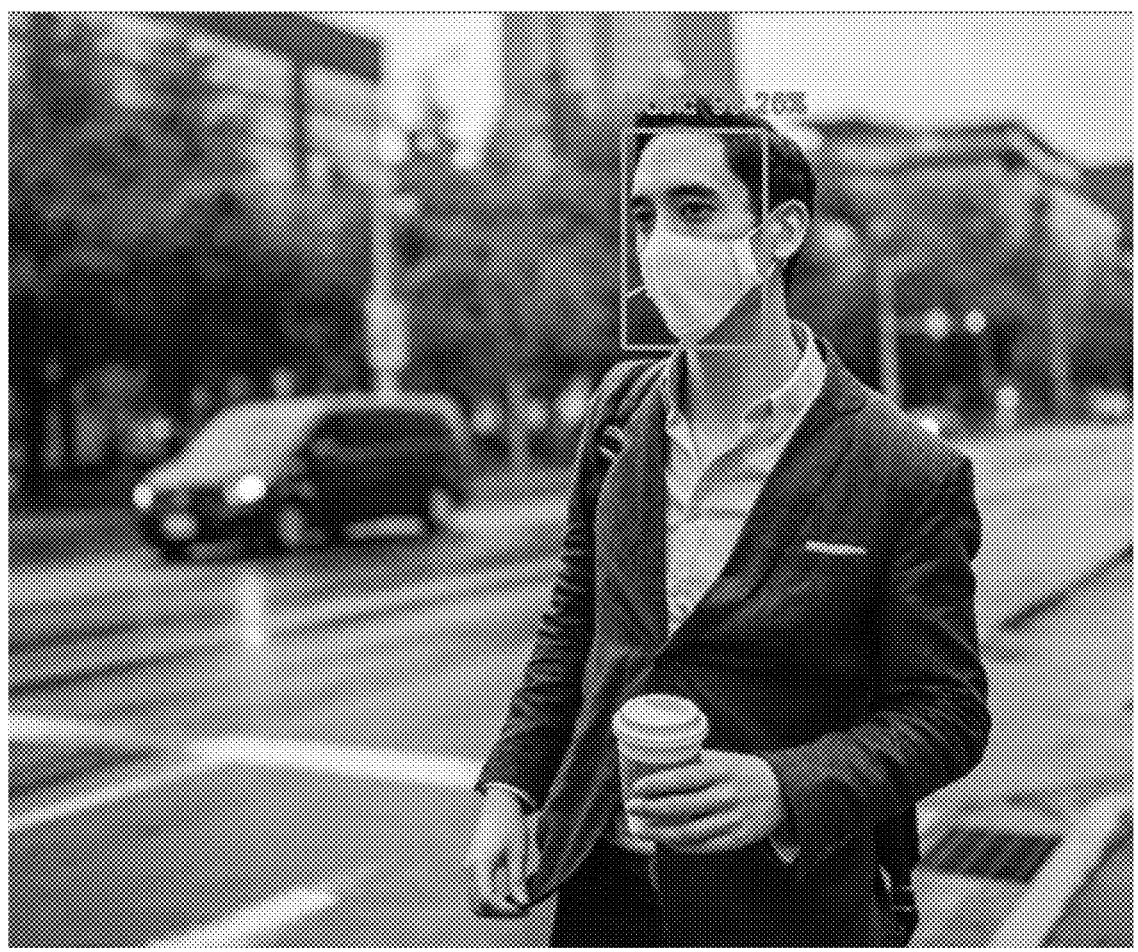
FIG. 6 illustrates results of searching content on real time basis according to an embodiment of the present disclosure.
Figure 6:
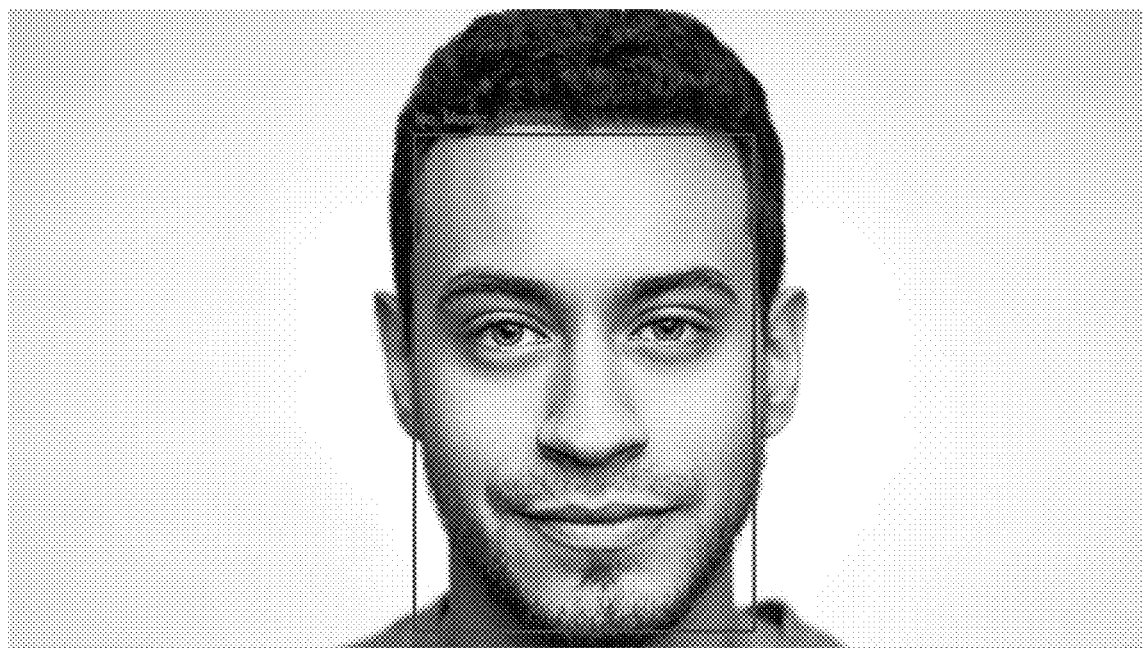
Figure 6:
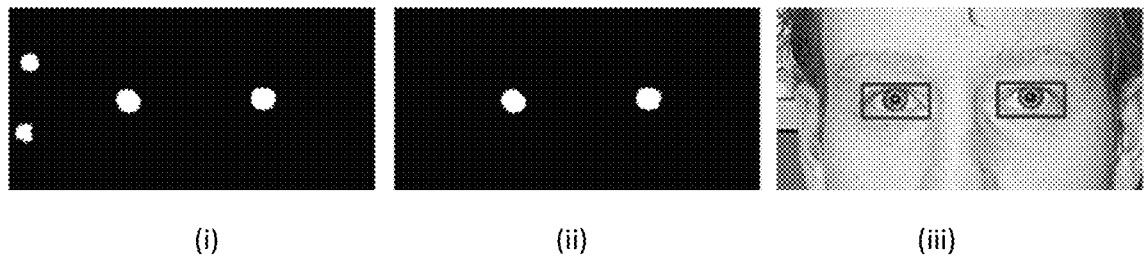
Figure 6:
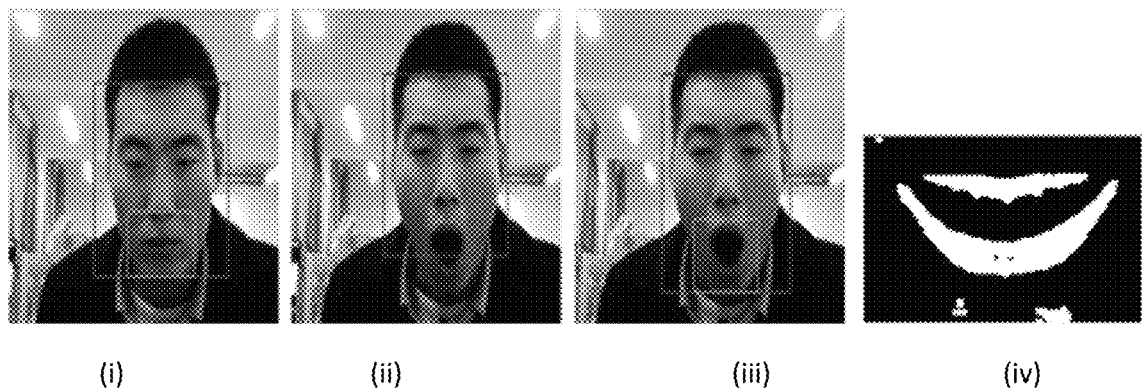

Similarly images of face were captured having mark or without mark of moving image data. The data for movements of image i.e. captured using active surveillance system having CCTV camera. The captured data is recorded as shown in FIG. 6, FIG. 6 (a), FIG. 6 (b) and FIG. 6 (c). FIG. 6, FIG. 6 (a), FIG. 6 (b) and FIG. 6 (c) show the image with movements of persons are categorized by classification of person with mark or without mask. GPS data with image was also collected with cellphone tower based or mobile equipment identification no registration. The data is recorded and stored and analyzed based on different classification. The system must be real time based with data storing capabilities. Individuals should be intimated directly by the warning system through messages of violation of law warning message from server to particular no identified. The system emit a non-alarming audio visual cue or send advisory signal to prevent movements of persons without marks. FIG. 6(b) and FIG. 6(c) are useful for giving the data if persons having some medical problems like eye flue and symptoms of breathing or virus. So that spreading of same can be avoided by alarming the peoples in near area.

Advantages of System:
Effective accident detection
    Based on smart phone sensors, and event propagation
High speed of accident information propagation
    Due to high speed trans-receiver for accident information propagation
Traffic analysis using CCTV
Helmet analysis using CCTV
Mask wearing analysis using CCTV
Driver parameter analysis using smart phone
    Is the driver drowsy or not, if the driver is drowsy, then communicate data to other vehicles accordingly for information propagation
Integration using machine learning
    ML will be used for classification of user data
Social distancing analysis using CCTV
Ease of adding other parameters
    Adding parameters like oxygen level monitoring, road quality detection can be added
Prediction of accident using machine learning
    Using ML the propagated data will be analyzed for early accident detection
Result on Real Time Basis and Conclusion.

The following results were obtained for social distancing, face mask detection, accident detection and drowsiness detection, Mouth Detection for Drowsiness Prediction The accuracy of the proposed method is also high, the following table showcases the accuracy of the proposed work,

| Number of samples | Acc. (%) for Social Distancing | Acc. (%) for Helmet and Mask | Acc. (%) for Accident Detection | Acc. (%) for Drowsiness |
| --- | --- | --- | --- | --- |
| 5 | 100 | 100 | 100 | 100 |
| 10 | 90 | 90 | 90 | 90 |
| 20 | 95 | 95 | 95 | 95 |
| 30 | 96 | 96 | 96 | 96 |
| 50 | 97 | 96 | 97 | 96 |
| 100 | 98 | 98 | 98 | 98 |
| 200 | 99 | 99 | 98 | 98 |
| 500 | 98 | 98 | 99 | 99 |

Table for system accuracy

From the results it is clear that the proposed system is very accurate in detection of vehicular events, and thus can be used for real-time systems.

What is claimed is:
1. A tracking and alerting traffic management system, to determine a social distance or norms violation between a plurality of communicative pairs, the system comprising:
    a Closed Circuit Television (CCTV) for capturing images comprising user's data like user movements, and facial data, or smartphone data in case of accident detection;

wherein each of the image have plurality of communicative pairs including two communicating entities participating in a corresponding one or more of a communicative act;

a wireless trans-receiver device for event propagation and sending the user's data and/or the smartphone data to a database;

a sensor for getting the data of smart phones based on Global Positioning System (GPS) system specially in case of accidental case;

a processor having Convolutional Neural Network (CNN) technology for analysing and reverting the user's data to a control room to determine a pairwise social distancing based on a particular behavior like a movement, stopping or falling;

a hardware for storing the user's data and/or the smartphone data captured based on classification and analysed parameters; and a machine learning based device for integration of data received from processor or sensors for visualization and processing final data to citizens or to governments for monitoring and sending the final data to alarming sensors for non instructive alerts if violations of social distancing norms.

2. The system as claimed in claim 1, wherein the said processor is configured to present at least a first social distance and a second social distance between communicative pairs to indicate changes in respective social perception levels on real time basis.

3. The system as claimed in claim 1, wherein the CNN is designed for identifying facial data of users wherein data is captured for masked, non-masked users, helmet wearing and non-helmet wearing users.

4. The system as claimed in claim 1, wherein the sensor for getting smart phone data is used in case of accidental alert and tracking if a reading go beyond a predetermined level to transmit information in a wireless manner with help of an accelerometer.

5. The system as claimed in claim 1, wherein the wireless trans-receiver device propagates the events either to other vehicles or to the authorities.

6. The system as claimed in claim 1, wherein Machine learning techniques are used for classification of the user's data or analysing propagated smartphone data for early accidental detection.

7. The system as claimed in claim 1, wherein an alarm is attached to the CCTV camera for alerting the user in case social distancing norms are violated or in case of overcrowding.

* * * * *